(12) United States Patent
Kang et al.

(10) Patent No.: US 11,503,262 B2
(45) Date of Patent: *Nov. 15, 2022

(54) IMAGE PROCESSING METHOD AND DEVICE FOR AUTO WHITE BALANCE

(71) Applicant: SAMSUNG ELECTRONICS CO., LTD., Suwon-si (KR)

(72) Inventors: Han-Sol Kang, Yongin-si (KR); Ju-Hyun Cho, Suwon-si (KR); Dong-Hee Kwon, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 128 days.

This patent is subject to a terminal disclaimer.

(21) Appl. No.: 16/902,315

(22) Filed: Jun. 16, 2020

(65) Prior Publication Data

US 2020/0314402 A1 Oct. 1, 2020

Related U.S. Application Data

(63) Continuation of application No. 16/057,856, filed on Aug. 8, 2018, now Pat. No. 10,721,449.

(30) Foreign Application Priority Data

Sep. 13, 2017 (KR) .......................... 10-2017-0117228

(51) Int. Cl.
  *H04N 9/73* (2006.01)
  *G06T 7/90* (2017.01)
(52) U.S. Cl.
  CPC ............... *H04N 9/735* (2013.01); *G06T 7/90* (2017.01); *G06T 2207/20021* (2013.01); *G06T 2207/30201* (2013.01)

(58) Field of Classification Search
  None
  See application file for complete search history.

(56) References Cited

U.S. PATENT DOCUMENTS

| 6,975,759 B2 | 12/2005 | Lin |
| 7,778,481 B2 | 8/2010 | Watanabe |
| 8,089,525 B2 | 6/2012 | Takayama |

(Continued)

FOREIGN PATENT DOCUMENTS

| CN | 1663287 A | 3/2005 |
| CN | 1885952 A | 12/2006 |

(Continued)

OTHER PUBLICATIONS

Chinese Office Action dated Jul. 27, 2021, Cited in Chinese Patent Application No. 201810947539.6.

(Continued)

*Primary Examiner* — James M Hannett
*Assistant Examiner* — Dwight Alex C Tejano
(74) *Attorney, Agent, or Firm* — Volentine, Whitt & Francos, PLLC

(57) ABSTRACT

An auto white balance method is disclosed. The auto white balance method includes receiving image data to divide the image data into a plurality of partition cells, calculating an estimation value of a skin tone included in the image data, and selecting outliers for detection of a white point of the image data, based on at least some of the plurality of partition cells and the estimation value.

20 Claims, 23 Drawing Sheets

(56) References Cited

U.S. PATENT DOCUMENTS

| | | |
|---|---|---|
| 8,514,297 B2 | 8/2013 | Ikeda |
| 8,520,091 B2 | 8/2013 | Fujiwara et al. |
| 8,654,207 B2 | 2/2014 | Huang |
| 8,941,757 B2 | 1/2015 | Seok et al. |
| 9,398,280 B2 | 7/2016 | Nikkanen et al. |
| 9,530,045 B2 | 12/2016 | Wang et al. |
| 9,635,333 B2 | 4/2017 | Cho et al. |
| 10,721,449 B2 * | 7/2020 | Kang .................. G06T 7/90 |
| 2004/0156544 A1 | 8/2004 | Kajihara |
| 2005/0219587 A1 | 10/2005 | Hayaishi |
| 2006/0066912 A1 | 3/2006 | Kagaya |
| 2006/0232684 A1 | 10/2006 | Miki |
| 2006/0284991 A1 | 12/2006 | Eiichiro |
| 2007/0076947 A1 | 4/2007 | Wang |
| 2007/0104472 A1 | 5/2007 | Quan |
| 2007/0201853 A1 * | 8/2007 | Petschnigg ........... G03B 15/03 396/155 |
| 2008/0094485 A1 | 4/2008 | Huang |
| 2009/0002519 A1 * | 1/2009 | Nakamura ........... H04N 9/735 348/223.1 |
| 2009/0092297 A1 | 4/2009 | Kitoh |
| 2009/0167892 A1 | 7/2009 | Masahiro |
| 2010/0014775 A1 | 1/2010 | Eiichiro |
| 2012/0013763 A1 * | 1/2012 | Umeda .................. G06T 5/40 348/223.1 |
| 2013/0128073 A1 | 5/2013 | Seok |
| 2014/0071310 A1 | 3/2014 | Kai |
| 2017/0078636 A1 | 3/2017 | Cho |

FOREIGN PATENT DOCUMENTS

| | | |
|---|---|---|
| CN | 101166286 A | 4/2008 |
| CN | 101472188 A | 7/2009 |
| CN | 101631200 A | 1/2010 |
| CN | 104994362 A | 10/2015 |
| CN | 106878695 A | 6/2017 |
| JP | 2008-104051 A | 5/2008 |
| JP | 2009-159496 A | 7/2009 |
| JP | 2010-041622 A | 2/2010 |
| JP | 5215775 B2 | 6/2013 |
| JP | 2014-209681 A | 11/2014 |
| KR | 1020050016880 A | 2/2005 |
| KR | 1020130056442 A | 5/2013 |

OTHER PUBLICATIONS

Korean Notice of Allwance dated Feb. 9, 2022 Cited in KR Patent Application No. 10-2017-0117228.

* cited by examiner

FIG. 7B

| | FC | |
|---|---|---|
| 500 | 700 | 800 |
| 1200 | 1100 | 1000 |
| 300 | 550 | 800 |
| 280 | 350 | 600 |
| 700 | 800 | 900 |
| 780 | 850 | 810 |
| 750 | 700 | 680 |

D_FC points to cells: 500, 300, 280, 350

FIG. 8C

80  MeanOfRn, MeanOfBn: the average of R, B values
81  VarRn, VarBn: the variance of R, B values
82  α: tuning parameter
83  CurPatch.R, curPatch.B: the R, B value of current patch (like P)
84  TempDiffRn=CurPatch.R-MeanOfRn
85  TempDiffBn=CurPatch.B-MeanOfBn
86  if( (TempDiffRn * TempDiffRn <= VarRn*α) && (TempDiffBn * TempDiffBn <= VarBn *α))
87  FdAvg(CurPatch)
88  else
89  EXC(CurPatch)

IMAGE PROCESSING METHOD AND DEVICE FOR AUTO WHITE BALANCE

CROSS-REFERENCE TO RELATED APPLICATION

This is a Continuation of U.S. application Ser. No. 16/057,856, filed Aug. 8, 2018, and a claim of priority is made to Korean Patent Application No. 10-2017-0117228 filed on Sep. 13, 2017, in the Korean Intellectual Property Office, the subject matter of which is hereby incorporated by reference.

BACKGROUND

The inventive concept relates to image processing methods and devices. More particularly, the inventive concept relates to image processing methods and devices performing auto white balance on image data.

Auto white balance (AWB) is an image processing function that may be used to control the imaging and/or reproduction (e.g., display or printing) of an image, such that "white" (or lighter or brighter) portions or objects of the image may be appropriately visualized as being white, despite variations in image staging, color and/or image illumination (e.g., sunlight, fluorescent or incandescent lights, etc.). Effective AWB is often necessary to correct imaging and/or image reproductions where reproduced white portions or objects otherwise exhibit poor or undesirable coloring (e.g., bluish or reddish tinting of white portions).

This necessity arises from the recognize phenomenon that while the human eye is able to visually adapt to variations in staging, colors, and/or illumination, electronic imaging apparatuses (e.g., cameras) do not possess an innate ability to visually adapt in order to correct of compensate for varying image conditions. AWB is a technology commonly used to correct or compensate for various phenomena characterized by an undesired color shift where a color is changed in cameras depending on illuminants.

SUMMARY

The inventive concept provides an image processing method and device for auto white balance.

According to an aspect of the inventive concept, there is provided an auto white balance method performed by an image signal processor, the auto white balance method including; dividing image data into a plurality of partition cells, calculating a skin tone estimation value for the image data, and selecting outliers for detection of a white point of the image data based on at least one of the plurality of partition cells and the skin tone estimation value.

According to an aspect of the inventive concept, there is provided an auto white balance method including; dividing image data including a face image into a plurality of partition cells, calculating a skin tone estimation value based on selected partition cells included in the face image, and selecting a gray candidate cluster for performing auto white balance on the image data based on at least one of the selected partition cells and the estimation value.

According to an aspect of the inventive concept, there is provided an auto white balance method performed by an image signal processor, the auto white balance method including; dividing the image data including a face image into a plurality of partition cells, selecting partition cells associated with at least a portion of the face image from the plurality of partition cells, calculating a skin tone estimation value based on at least one of the selected partition cells, further selecting from among the selected partition cells those selected partition cells included in a first gray candidate cluster defined in a color space associated with the image data, and selecting a second gray candidate cluster for performing the auto white balance on the image data, based on the further selected partition cells included in the first gray candidate cluster and the skin tone estimation value.

According to an aspect of the inventive concept, there is provided an auto white balance method performed by an image signal processor, the auto white balance method including; dividing image data including a face image into a plurality of partition cells, detecting a face region associated with the face image from the image data, selecting partition cells associated with the face image from among the plurality of partition cells to define a set of selected partition cells, further defining the set of selected partition cells to define a set of further selected partition cells, and calculating a skin tone estimation value for the image data from the further selected partition cells.

BRIEF DESCRIPTION OF THE DRAWINGS

Embodiments of the inventive concept will be more clearly understood from the following detailed description taken in conjunction with the accompanying drawings in which:

FIGS. 7A and 7B are diagrams for describing an operation of selecting some partition cells included in a face region based on luminance, according to an exemplary embodiment;

FIGS. 8A to 8C are diagrams for describing an example of operation S130 of FIG. 4 according to an exemplary embodiment;

DETAILED DESCRIPTION

Hereinafter, exemplary embodiments will be described with reference to the accompanying drawings.

Figure 1:
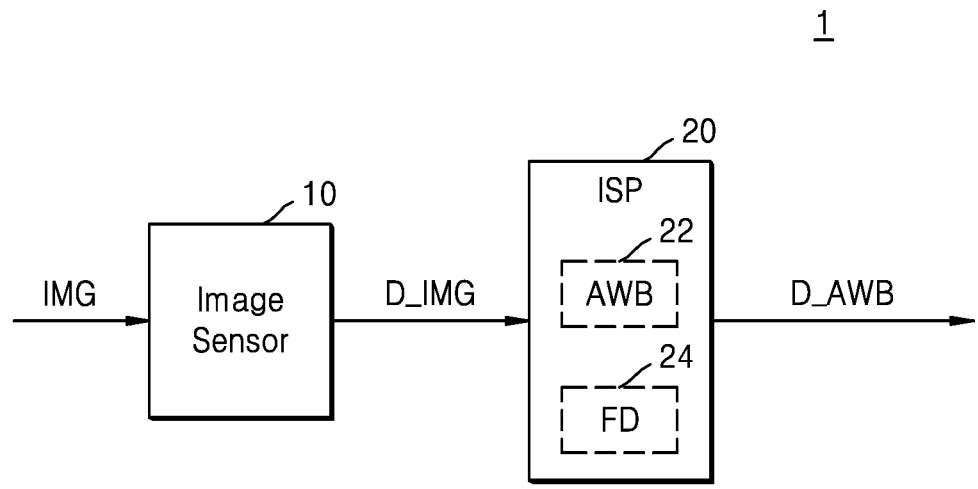
FIG. 1 is a block diagram of an image processing device according to an exemplary embodiment.

FIG. 1 is a general block diagram of an image processing device 1 according to an exemplary embodiment. The image processing device 1 may correspond to various systems incorporating an image signal processor, such as portable camcorders, smartphones and the like.

Referring to FIG. 1, the image processing device 1 comprises an image sensor 10 and an image signal processor 20. The image sensor 10 may be used to receive (or capture, or sense) an image IMG using (e.g.,) a lens, focusing circuitry, filters, etc. (not shown). Upon sensing the image IMG, the image sensor 10 may output corresponding image data D_IMG. The image data D_IMG may include various color data, such as the color and/or contrast information commonly associated RGB approaches or YUV approaches to image processing.

The image sensor 10 may include, for example, a charge-coupled device (CCD) and/or a complementary metal-oxide semiconductor (COMS) image sensor (CIS). For example, if the image sensor 10 includes a CIS, the image sensor 10 may include a pixel array, and a plurality of pixels included in the pixel array may each include a photo sensing element, where each photo sensing element generates an electrical signal in response (e.g.,) to the intensity of captured electromagnetic energy (e.g., optical light).

The image signal processor 20 may be used to receive the image data D_IMG from the image sensor 10, perform an RGB interpolation of the image data D_IMG in order to generate color component data RGB data (e.g., red (R), green (G), and/or blue (B) component data). Additionally, the image signal processor 20 may perform a YUV conversion in response to the RGB data and/or the image data D_IMG in order to generate YUV data (e.g., luminance (Y) and/or chrominance (U, V) signals. The image signal processor 20 may also perform various digital signal processing, such as contour emphasis for enhancing image quality. The image signal processor 20 may also be used to selectively divide the image data D_IMG into a plurality of partition cells and thereafter to perform various digital signal processing on one or more of the plurality of partition cells.

In an exemplary embodiment, each of the plurality of partition cells may be a single pixel or a patch including a plurality of pixels. Data of various types, formats and uses obtained by digital image processing performed by the image signal processor 20 may be stored in one or more memories (not shown, but e.g., a synchronous dynamic random access memory (SDRAM) or the like).

In addition to the foregoing, the image signal processor 20 may be used to perform a so-called auto white balance function (hereafter, "AWB") on the image data D_IMG. AWB is a function frequently associated with the digital image processing of image data D_IMG. During AWB a white point is identified among the image data D_IMG and a color sense adjustment is made to the image data D_IMG in relation to the white point. For example, the image data D_IMG may be adjusted in response to the gain of a chrominance component (R or B) determined in relation to the white point. Following AWB, the image signal processor 20 may output AWB-processed image data D_AWB.

In the illustrated example of FIG. 1, it is assumed that AWB is performed by an AWB module 22 of the image signal processor 20. In this context, the AWB module 22 be variously configured in hardware (e.g., through logical synthesis) and/or software (e.g., as firmware executed by the image signal processor 20).

Extending the description of the foregoing example, the image signal processor 20 may be used to detect a white point from the image data D_IMG. In certain embodiments, the detected white point may be data associated with a greatest (or largest) color change or signal intensity due to (e.g.,) an illumination source (or illuminant). In this regard, the image signal processor 20 may be used to determine a color temperature at a given RGB ratio for the detected white point. Subsequently, by adjusting gains for R and B components of the image data D_IMG according to the determined color temperature, a color sense for the image may be appropriately shifted. In this manner, as one example, color correction or color balance adjustment may be performed for the image data D_IMG.

Here, when color temperature for the image data D_IMG is changed by an illuminant, an adjustment may be made, whereby the detected white point is visually reproduced to remain white in appearance, rather than red or blue tinted, for example. That is, an adjustment by increasing a gain for R and decreasing a gain for B may be used to reduce an undesired blue appearance of the white point, or an adjustment by increasing the gain of B and decreasing the gain of R may be used to reduce an undesired red appearance of the white point.

The image signal processor 20 of FIG. 1 may also be used to select a white point corresponding to various criterion associated with the AWB being performed. However, when a white point is selected (or detected) by the image signal processor 20 from image data D_IMG including image data corresponding to a skin tone area of the image, difficulties in performing a conventional AWB may arise. That is, when an estimation value associated with a white point detected from a skin tone region of the image data D_IMG is obtained, for example, a subsequently performed, conventional AWB may be performed with unacceptable results. In contrast, exemplary embodiments may be used to more accurately perform a AWB in relation to image data D_IMG including skin tone image data, such as a face. Thus, the image signal processor 20 may be used to calculate an estimation value associated with skin tone related image data, using for example a face portion of the a captured image (hereafter, "skin tone estimation value"), and thereafter select an outlier of a white point based, at least in part, on the skin tone estimation value. Using this approach, the image signal processor 20 of FIG. 1 may more accurately select a white point serving as a data predicate for an AWB performed in relation to the image data D_IMG.

Figure 2:
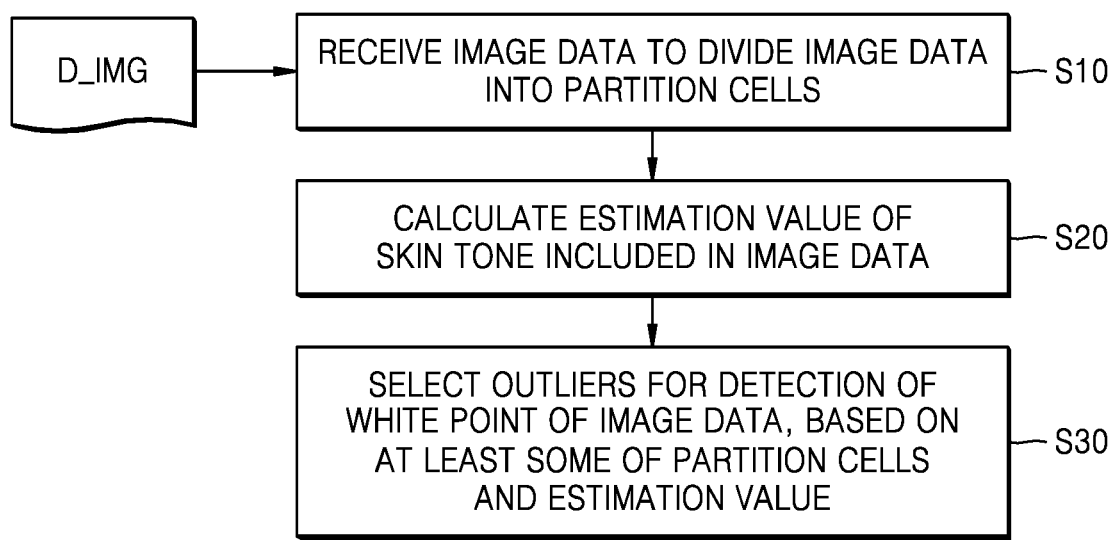
FIG. 2 is a flowchart illustrating an auto white balance method according to an exemplary embodiment.

FIG. 2 is a flowchart generally summarizing an AWB method according to an exemplary embodiment. The AWB method of FIG. 2 may be performed by the image signal processor 20 of FIG. 1.

Referring to FIG. 2, the image signal processor 20 may receive the image data D_IMG and may divide the image data D_IMG into a plurality of partition cells (S10). Each of the plurality of partition cells may be, for example, a pixel or a patch including a plurality of pixels. Alternatively, each partition cell may be a block including a plurality of patches. Each partition cell may include a plurality of vertexes.

After partitioning of the image data D_IMG into the plurality of partition cells, the image signal processor 20 may be used to calculate a skin tone estimation value associated with a skin tone included in the received image data D_IMG (S20). In certain exemplary embodiments wherein a face image is included in the image data D_IMG, the image signal processor 20 may calculate the skin tone estimation value based on image data associated with the face image.

For example, the image signal processor 20 may select one or more partition cells from among the plurality of partition cells that include at least part of an identified face image (hereafter, "selected partition cells"), and thereafter calculate a skin tone estimation value based (e.g.,) on one or more selected color component(s) for each one of the selected partition cells. In an exemplary embodiment, the skin tone estimation value may be calculated as a mean value derived from color component(s) of the selected partition cells.

After the skin tone estimation value is calculated, the image signal processor 20 may be used to select an outlier for detection of a white point of the image data D_IMG based on at least one of the plurality of partition cells included in the image data D_IMG and the skin tone estimation value (S30). In an exemplary embodiment, the outlier may associated with one or more partition cell(s) otherwise excluded from the white point detecting process. That is, the image signal processor 20 may use one or more partition cells that were not used to calculate the skin tone estimation value (hereafter, "non-selected partition cells") to determine the outlier.

For example, the white point may be determined in relation to a mean of color components of non-selected partition cells included in a gray candidate cluster among the plurality of partition cells included in the image data. In an exemplary embodiment, the image signal processor 20 may identify certain non-selected partition cells included in a first gray candidate cluster defined in a color space from among the plurality of partition cells included in the image data D_IMG, and may thereafter determine the (a first) outlier from the first gray candidate cluster based on the skin tone estimation value. The image signal processor 20 may also identify as a second gray candidate cluster of non-selected partition cells outside the first gray candidate cluster and determine another (a second) white point based on the non-selected partition cells included in the second gray candidate cluster.

Figure 3:
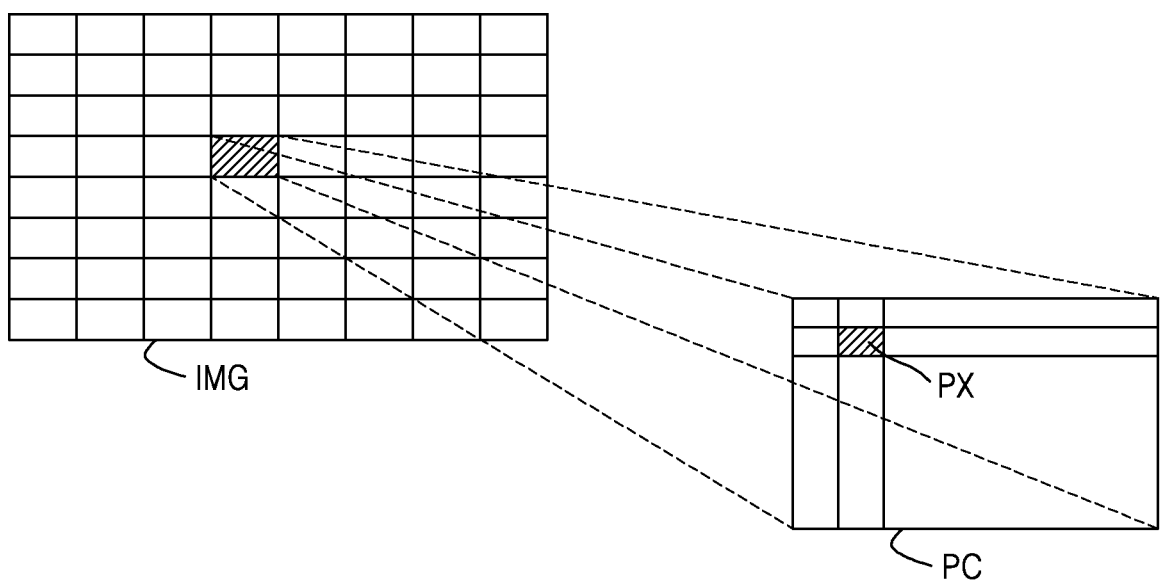
FIG. 3 is a block diagram for describing an example of a partition cell illustrated in FIGS. 1 and 2.

FIG. 3 is a conceptual diagram further illustrating one approach to the definition of the plurality of partition cells in the context of the exemplary embodiments previously described in relation to FIGS. 1 and 2.

Referring to FIG. 3, an image IMG may be divided into a plurality of patches PC, where each patch PC includes a plurality of pixels PX. The image IMG includes (or may be defined in relation to) information associated with various color and/or luminance values used to display the image on a display device for some duration of time (e.g., one screen, or one frame). That is, each of the pixels PX included in the image IMG may produce one or more electrical signals quantified by data indicating one or more color and/or luminance component(s). For example, pixels PX generating the image data corresponding to the captured image IMG may be characterized by and operate according to one or more conventionally understood video standards such as RGB or YUV, etc.

In an exemplary embodiment, the image signal processor 20 may perform an AWB according to patch units or pixel units. For example, if the AWB is performed by patch units, the image signal processor 20 may calculate a skin tone estimation value based on color information associated with one or more selected patches, determine one or more white points from non-selected patches, and determine one or more outliers based on the white point(s) and the skin tone estimation value. Hereinafter, for convenience of description, examples are described assuming that an AWB is performed according to patch units.

Figure 4:
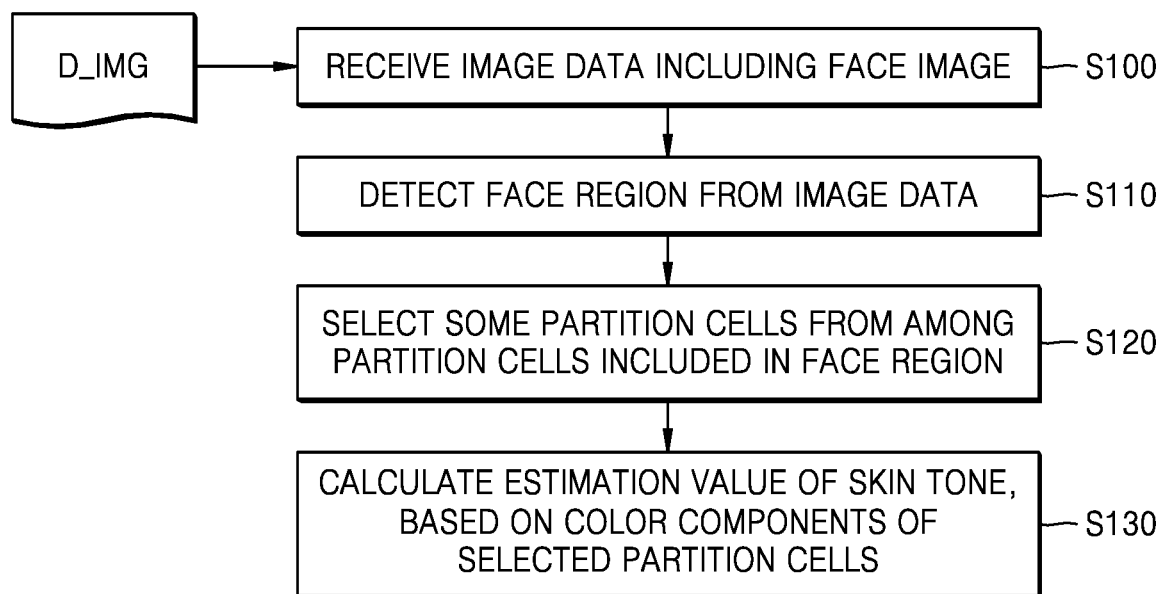
FIG. 4 is a flowchart illustrating an example of operation S20 of FIG. 2 according to an exemplary embodiment.

FIG. 4 is a flowchart summarizing in one example the step of calculating a skin tone estimation value (S20) of FIG. 2 according to an exemplary embodiment. The method described in relation to FIG. 4 may be performed, for example, by the image signal processor 20 of FIG. 1.

Referring to FIGS. 1 and 4, the image signal processor 20 may receive image data D_IMG including data associated with at least a portion of a face image contained in a captured image. (S100).

Thereafter, the image signal processor 20 may be used to detect a face region associated with the face image from the image data D_IMG (S110). For example, the detection of the face image and corresponding face region may be performed using a face detector 24 shown in FIG. 1 as being included in the image signal processor 20. The face detector 24 may perform face detection on the image data D_IMG for detecting at least a portion of a face having a feature close to a pre-stored model pattern such as a contour, a color, or the like of the face. Also, the face detector 24 may generate coordinate information identifying the detected face region, where the generated coordinate information may be used to perform the AWB. Here, the face detector 24 may be implemented in hardware (e.g., as a logical synthesis) and/or in software (e.g., firmware executed by a processor).

In order to detect the face region, the face detector 24 may detect one or more relatively invariable feature(s) (e.g., eyes, nose, and mouth, texture, skin tone, etc.) of the face using a feature-based face detection method. Thereafter, the face detector 24 may calculate feature point coordinates associated with the face. Alternatively, the face detector 24 may detect the face region using a face template-based detection method, or may detect the face region by using a support vector machine (SVM) method which learns a face and a part other than the face by using a plurality of sample images, and then, detects a face region from input image data D_IMG.

However, face detection and corresponding point coordinate generation is performed, the image signal processor 20 may thereafter select one or more partition cells from among a plurality of partition cells included in the face region (S120). These face region associated partition cells may be termed "selected partition cells" or "first-selected partition cells" to distinguish them from "non-selected partition cells". Thus, in an exemplary embodiment, the image signal processor 20 may define as selected partition cells those partition cells having some or all constituent vertexes included in a face region from among the plurality of partition cells.

Moreover, the image signal processor 20 may exclude as non-selected partition cells those partition cells having luminance values less than or equal to a threshold luminance value from among the plurality of partition cells. In an exemplary embodiment, the threshold luminance value may be a value that is derived by statistical analysis of sample image data.

After the selected partition cells have been identified, the image signal processor 20 may calculate a skin tone estimation value based on color components associated with the selected partition cells (S130). In an exemplary embodiment, the image signal processor 20 may calculate a global mean value of the color components associated with the selected partition cells and compare the global mean value with the color component(s) of each of the selected partition cells. In this manner, the image signal processor 20 may exclude certain selected partition cells having a color component having a difference with respect to the global mean value that is greater than a reference deviation. Accordingly, the skin tone estimation value may be calculated using only selected partition cells having a color component within a specified range, such that the resulting skin tone estimation value may be calculated as a final mean value of the color components for appropriately designated selected partition cells.

Figure 5A:
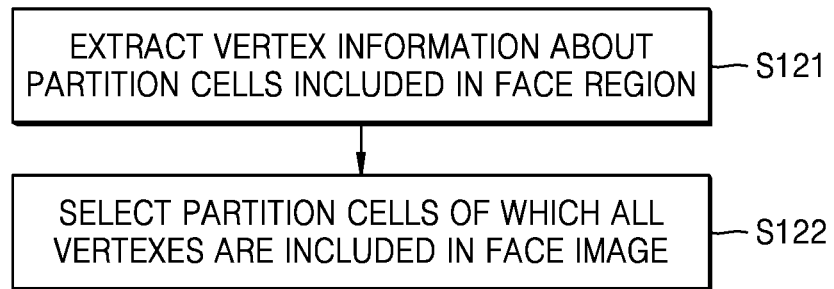
FIGS. 5A and 5B are diagrams for describing an operation of selecting some partition cells included in a face region, according to an exemplary embodiment.
Figure 5B:
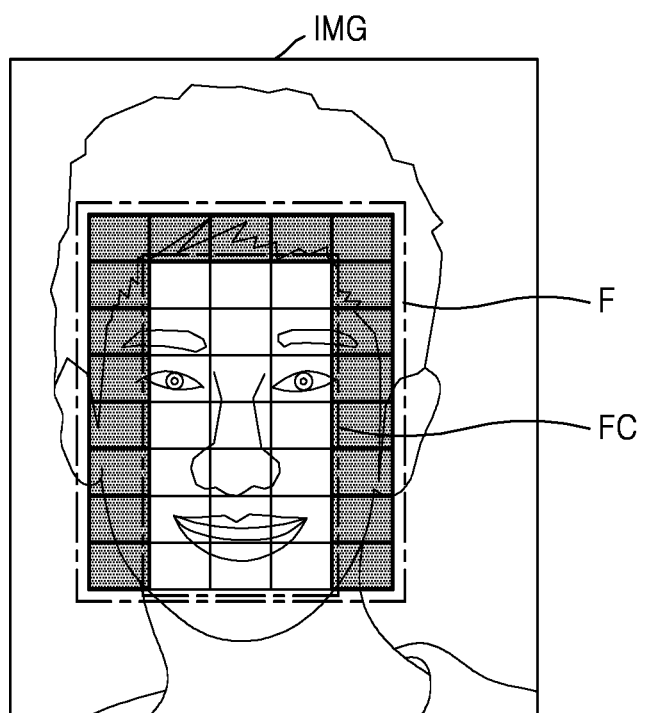

FIG. 5A is a flowchart and FIG. 5B is a conceptual diagram further describing the selection of certain partition cells as selected partition cells associated with a detected face region according to an exemplary embodiment. Here, FIG. 5A further illustrates one example of method step S120 of FIG. 4. FIG. 5B illustrates an exemplary image divided in partition cells (patches) that may be selected using the method of FIGS. 4 and 5A.

Referring to FIGS. 1, 5A and 5B, the image signal processor 20 may be used to extract vertex information associated with each of the plurality of partition cells included in a face region F (S121). The face region F may be a region detected by the image signal processor 20 based on a face image. For example, the face region F may be detected by the face detector 24 included in the image signal processor 20 and may include multiple partition cells. That is, the face region F may include multiple partition cells having at least one vertex included in (or falling within) the detected face image from among the plurality of partition cells forming the image IMG.

Once vertex information associated with selected partition cells falling within the face region has been extracted, the image signal processor 20 may further select certain partition cells FC having all vertexes included in the face image from among the plurality of selected partition cells falling within the face region F (S122). In other words, all the vertexes of the further selected (or "second-selected") partition cells FC may be included in the face image. As another example, the image signal processor 20 may further select partition cells having (e.g.,) three or more vertexes falling within the face image from among the plurality of selected partition cells.

In an exemplary embodiment, the image signal processor 20 may calculate a skin tone estimation value based on color component(s) of at least one of the second-selected partition cells FC. In an exemplary embodiment, the skin tone estimation value may be calculated as a mean value of color component(s) of at least one of the second-selected partition cells FC.

First-selected partition cells, other than the second-selected partition cells FC, associated with the face region F may be excluded from the calculation of the skin tone estimation value. Therefore, all non-selected partition cells from the image IMG (e.g., non-facial head regions, background regions, etc.) that are not associated with the face image may also be excluded from the calculation of the skin tone estimation value, thereby improving an accuracy of the estimation value.

Figure 6A:
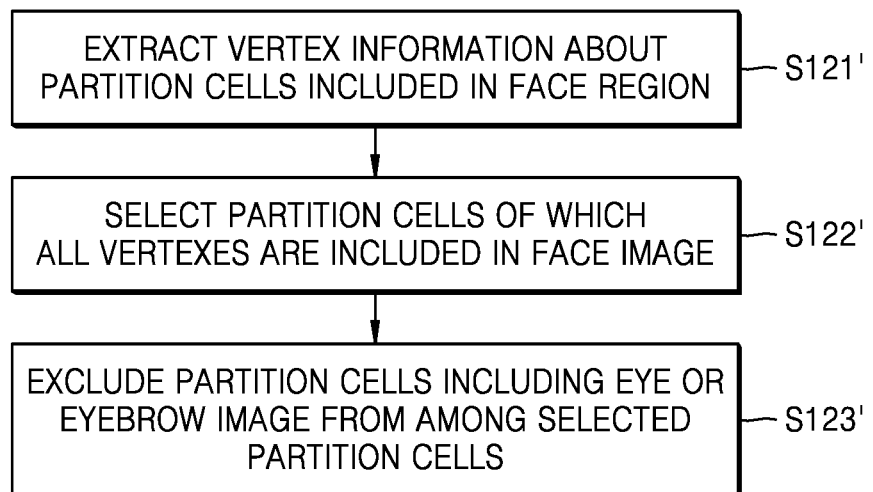
FIGS. 6A and 6B are diagrams for describing an operation of selecting some partition cells included in a face region, according to an exemplary embodiment.
Figure 6B:
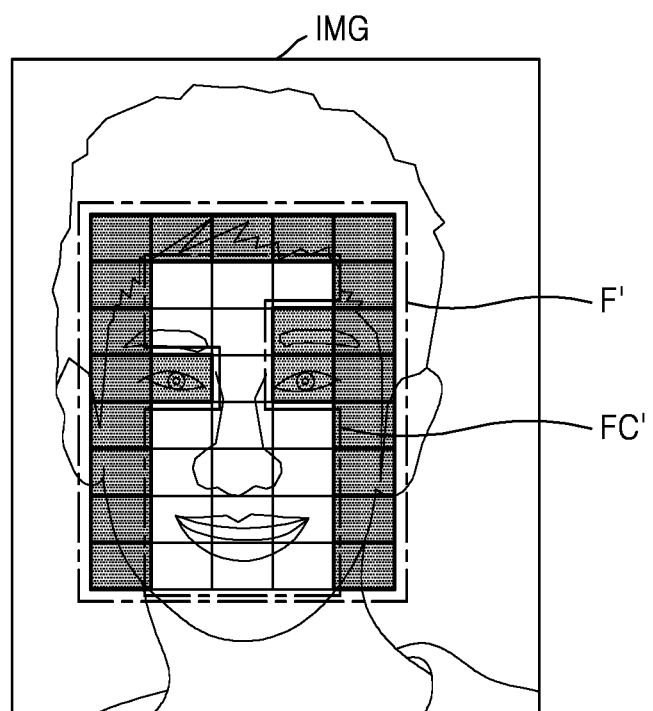

FIG. 6A is another flowchart and 6B is another conceptual diagram further describing in another approach the selecting of certain partition cells included in a face region according to an exemplary embodiment. More particularly, FIG. 6A is a flowchart illustrating another embodiment that may be used to select partition cells (S120 of FIG. 4). FIG. 6B illustrates another exemplary image in relation to selected partition cells.

In the context of the example previously described in relation to FIGS. 5A and 5B and referring to FIGS. 1, 6A and 6B, the image signal processor 20 may be used to extract vertex information associated with partition cells included in (falling within) a face region F' (S121'). Here, selected partition cells FC' are those having all vertexes included in the face image F' (S122'). However, certain of these otherwise (or possibly) selected partition cells are excluded, namely those partition cells including an eye or eyebrow image from among the selected partition cells FC' (S123'). Thus, all partition cells having all constituent vertexes included in the face image are selected or designated as selected partition cells FC', except those partition cells including the eye or eyebrow image. In this context, information regarding eye and eyebrow features as well as corresponding image coordinate information may be generated by the face detector 24 included in the image signal processor 20.

Figure 7A:
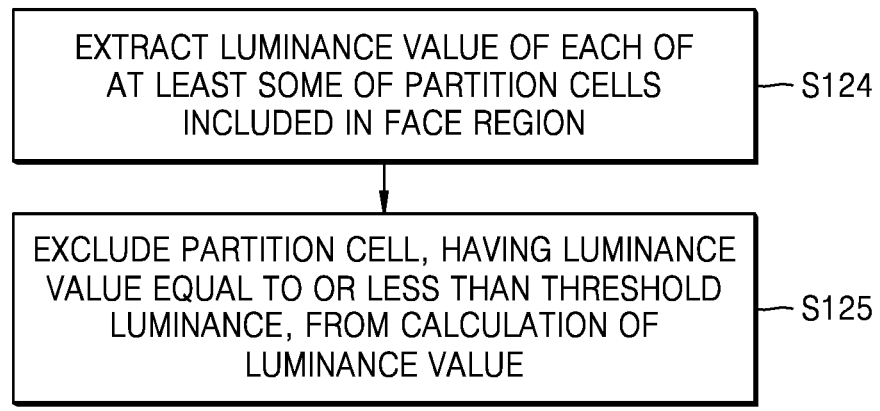

FIGS. 7A and 7B are diagrams describing exemplary embodiments wherein selection of certain partition cells included in a face region is based on luminance. That is, FIG. 7A is a flowchart summarizing another approach to the method step S120 of FIG. 4, and FIG. 7B is a conceptual diagram illustrating a corresponding array of luminance values for a plurality of partition cells.

Referring to FIGS. 1, 7A and 7B, the image signal processor 20 may be used to extract respective luminance values for partition cells included in a face region. That is, the image signal processor 20 may extract luminance values for first-selected partition cells FC according to the selection operation described above with reference to FIG. 5 for example.

Each of the first-selected partition cells FC has a respective luminance value that may be obtained (e.g.,) by digitizing luminance information associated with a captured image (S124). That is, an image will usually include partition cells characterized by relatively low luminance values associated with darker portions of the image as well as other partition cells characterized by relatively high luminance values associated with brighter portions of the image.

Once respective luminance values have been extracted, the image signal processor 20 may exclude certain partition cells having a corresponding luminance value less than or equal to a threshold luminance value from the calculation of the skin tone estimation value (S125).

For example, assuming a threshold luminance value of 500, the image signal processor 20 may calculate a skin tone estimation value based on first-selected partition cells FC, excluding those first-selected partition cells D_FC having a corresponding luminance value equal to or less than 500. This is another type of second selection of partition cells from an initial set of first-selected partition cells providing a more accurate skin tone estimation value. That is, partition cells including darker image portions may be excluded from the calculation of the skin tone estimation value, thereby improving accuracy of the estimation value.

Figure 8A:
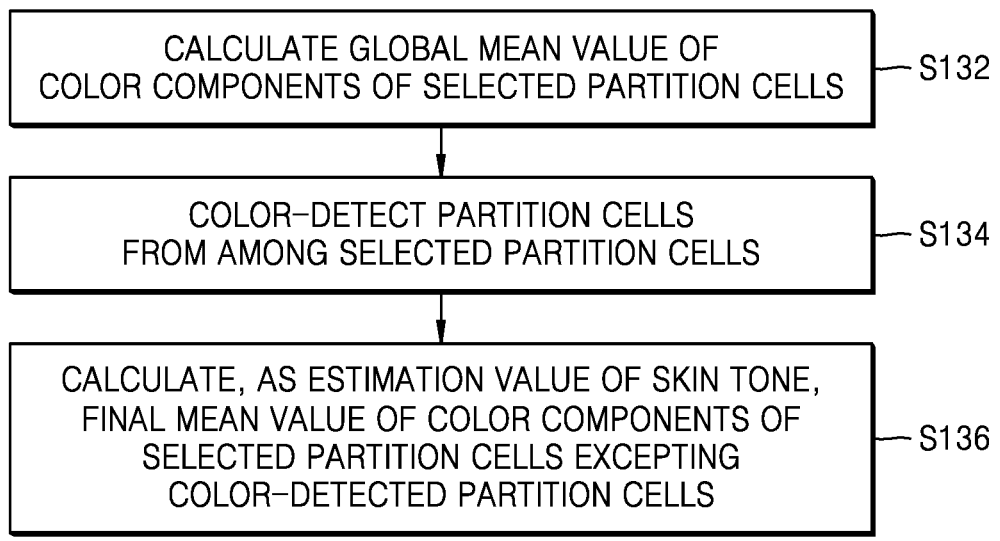
Figure 8B:
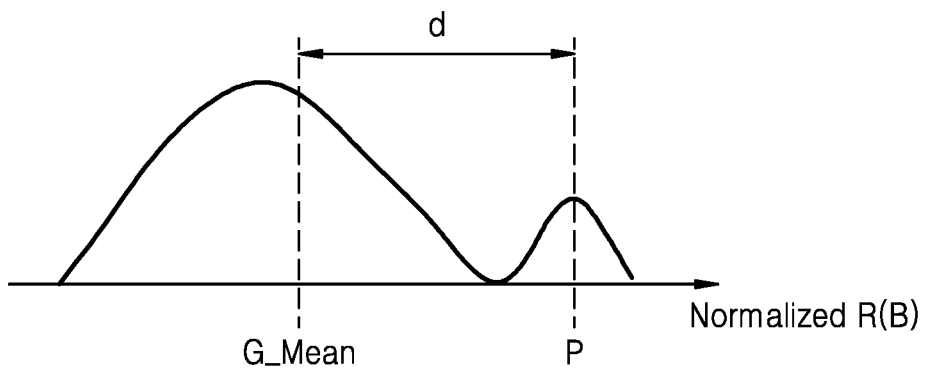

FIGS. 8A, 8B and 8C are diagrams collectively describing different approached to the method step S130 of FIG. 4 according to exemplary embodiments. FIG. 8A is a flowchart summarizing the calculation of a skin tone estimation value according to an exemplary embodiment, FIG. 8B is a graph showing distribution of color components for selected partition cells, and FIG. 8C is a pseudo code example that may be used to calculate the skin tone estimation value.

Referring to FIGS. 1 and 8A, the image signal processor 20 may be used to calculate a global mean value of color components of selected partition cells (S132). The selected partition cells may be, for example, partition cells for which the operation described above with reference to FIGS. 5A to 7B have been performed. The color components of the selected partition cells may each include, for example, a red component and a blue component. The image signal processor 20 may be used to calculate a mean value of the red components of the selected partition cells as a global mean value of the red components and may calculate a mean value of the blue components of the selected partition cells as a global mean value of the blue components.

Subsequently, the image signal processor 20 may be used to color-detect (another form of further selection of partition cells) certain selected partition cells, having a color component where a difference with respect to a global mean value is greater than the reference deviation, from among the selected partition cells (S134). In an exemplary embodiment, the image signal processor 20 may compare the global mean value of the red components with the red component of each of the selected partition cells and may detect partition cells having a red component where a difference with respect to the global mean value of the red components is greater than the reference deviation, based on a result of the comparison. Alternately or additionally, the image signal processor 20 may compare the global mean value of the blue components with the blue component of each of the selected partition cells and may detect partition cells having a blue component where a difference with respect to the global mean value of the blue components is greater than the reference deviation, based on a result of the comparison.

In an exemplary embodiment, the reference deviation may be a multiplication of a tuning parameter and a variance of each of the color components of the selected partition cells in a color space. For example, the image signal processor 20 may be used to calculate a variance of the red component and a variance of the blue component of each of the selected partition cells. The tuning parameter may be calculated based on statistical processing of pieces of sample image data, for example.

The reference deviation may be calculated as at least one of a multiplication of a tuning parameter and a variance of a red component and a multiplication of a tuning parameter and a variance of a blue component. For example, in a case of detecting partition cells having a red component where a difference with respect to a global mean value of red components is greater than the reference deviation, the image signal processor 20 may calculate the reference deviation through the multiplication of the tuning parameter and the variance of the red component. Also, in a case of detecting partition cells having a blue component where a difference with respect to a global mean value of blue components is greater than the reference deviation, the image signal processor 20 may calculate the reference deviation through the multiplication of the tuning parameter and the variance of the blue component.

With respect to the embodiment described in relation to FIGS. 8A, 8B and 8C, a variance may be based on calculation of the reference deviation, but is not limited thereto. For example, the reference deviation may be calculated based on a variation of coefficient or a standard deviation of the color components of the selected partition cells.

Then, the image signal processor 20 may be used to calculate, as a skin tone estimation value, a final mean value of color components of the color-detected selected partition cells (S136); that is, excepting the those partition cells failing color-detection. The final mean value may be calculated based on the color components of the color-detected selected partition cells, thereby providing a more accurate skin tone estimation value.

Referring to FIG. 8B, a distance 'd' between a global mean value G_Mean and a color component P of an arbitrary partition cell is shown in a distribution chart. The distribution chart may be, for example, a distribution chart of color components of the selected partition cells in a normalized red (blue) space Normalized R(B).

When the distance 'd' between the global mean value G_Mean and the color component P of the partition cell is relatively short, the partition cell may be determined to be a partition cell having a relatively dominant skin tone feature. In contrast, when the distance 'd' between the global mean value G_Mean and the color component P of the partition cell is relatively long, the partition cell may be determined as relatively deviating from a feature of the skin tone.

Therefore, in order to calculate an accurate skin tone estimation value, partition cells where the distance 'd' from the global mean value G_Mean is greater than the reference deviation may be excluded. Therefore, a final mean value of color components of partition cells having the relatively dominant feature of the skin tone among the selected partition cells may be calculated as a skin tone estimation value having improved accuracy.

Referring to FIG. 8C, a global mean value MeanOfRn of red components and a global mean value MeanOfBn of blue components of the selected partition cells, a variance VarRn of a red component and a variance VarBn of a blue component of an arbitrary partition cell, a tuning parameter a, and a variance of each of a red component CurPatch.R and a blue component CurPatch.B of the arbitrary partition cell may be declared in the pseudo code (80 to 83). Also, a difference between the red component CurPatch.R and a global mean value MeanOfRn of the red component of the arbitrary partition cell may be defined as a temporary variable TempDiffRn, and a difference between the blue component CurPatch.B and a global mean value MeanOfBn of the blue component of the arbitrary partition cell may be defined as a temporary variable TempDiffBn.

Subsequently, in the color components of the arbitrary partition cell, whether a difference with respect to the global mean value MeanOfRn is greater than the reference deviation VarRn*a and a difference with respect to the global mean value MeanOfBn is greater than the reference deviation VarBn*a may be determined based on a conditional statement (86 to 89). For example, a reference deviation for comparison of the red component may be a multiplication of the tuning parameter a and the variance VarRn of the red component, and a reference deviation for comparison of the blue component may be a multiplication of the tuning parameter a and the variance VarBn of the blue component.

In an exemplary embodiment, when the difference between the red component CurPatch.R and the global mean value MeanOfRn of the arbitrary partition cell is equal to or less than the reference deviation VarRn*a and the difference between the blue component CurPatch.B and the global mean value MeanOfBn of the blue component of the arbitrary partition cell is equal to or less than the reference deviation VarBn*a, the arbitrary partition cell may be based on the calculation of the estimation value of the skin tone (FdAvg(CurPatch)). Alternatively, when the difference with respect to the global mean value MeanOfRn is greater than the reference deviation VarRn*a and the difference with respect to the global mean value MeanOfBn is greater than the reference deviation VarBn*a in the color components of the arbitrary partition cell, the arbitrary partition cell may be excluded from the calculation of the estimation value of the skin tone (EXC(CurPatch)).

Figure 9:
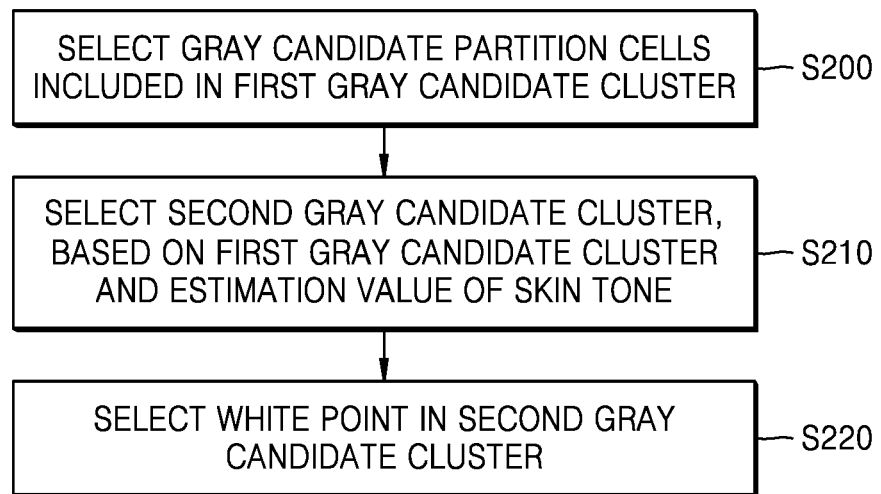
FIG. 9 is a flowchart illustrating an example of operation S30 of FIG. 2 according to an exemplary embodiment.

FIG. 9 is a flowchart summarizing in one example the method step S30 of FIG. 2 according to an exemplary embodiment. The method step and underlying operation(s) described by FIG. 9 may be performed, for example, by the image signal processor 20 of FIG. 1.

Referring to FIG. 9, the image signal processor 20 may select gray candidate partition cells included in a first gray candidate cluster defined in a color space (S200). In an exemplary embodiment, the color space where the first gray candidate cluster is defined may be configured with a normalization value of each of a red (R) component and a blue (B) component with respect to a sum of the red (R) component, a green (G) component, and the blue (B) component. Alternatively, the color space may be configured with a normalization value of each of the red (R) component and the blue (B) component with respect to the green (G) component.

Subsequently, the image signal processor 20 may select a second gray candidate cluster, based on the first gray candidate cluster and a skin tone estimation value (S210). In an exemplary embodiment, if image data D_IMG includes a face image, the skin tone estimation value may be a mean value of color components of at least one of a plurality of partition cells included in the face image. The skin tone estimation value may include a red component estimation value and a blue component estimation value associated with the skin tone.

In this context, an outlier for detection of a white point may be selected in the first gray candidate cluster, and the second gray candidate cluster may be the other region of the first gray candidate cluster, except the selected outlier. In other words, the selection of the second gray candidate cluster may be a process of narrowing (or further selecting) the first gray candidate cluster region in the color space.

In an exemplary embodiment, the image signal processor 20 may determine whether to select a first partition cell of gray candidate partition cells included in the first gray candidate cluster as a partition cell of the second gray candidate cluster, based on a red component estimation value, a blue component estimation value, and a value of each of a red component and a blue component of the first partition cell. This approach will be described in some additional detail hereafter.

Then, the image signal processor 20 may be used to select a white point in the second gray candidate cluster (S220). The white point may be, for example, a mean value of color components of partition cells included in the second gray candidate cluster.

According to an exemplary embodiment, an outlier for detection of a white point may be selected based on a skin tone estimation value and may be excluded from the detection of the white point, thereby preventing the AWB from being performed based on an inaccurate skin color. Also, partition cells relatively close to gray in image data may be selected based on the skin tone, and thus, the AWB with improved accuracy is performed.

Figure 10:
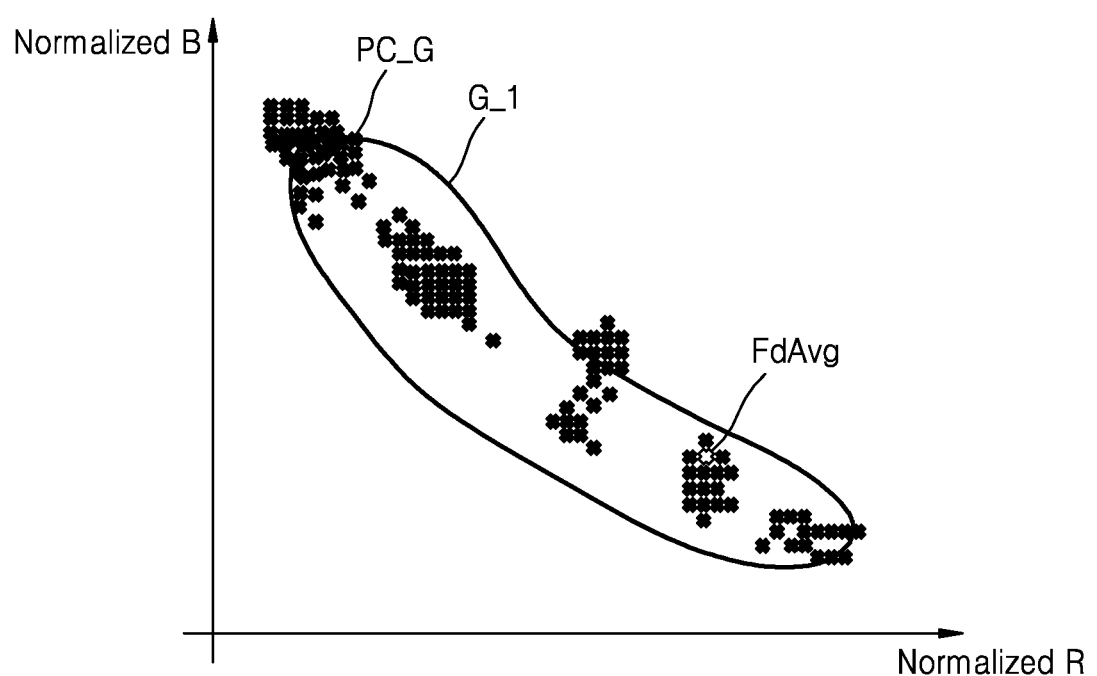
FIG. 10 is a graph showing a first gray candidate cluster defined in a color space according to an exemplary embodiment.

FIG. 10 is a graph showing a first gray candidate cluster defined in a color space according to an exemplary embodiment. The X axis of the graph represents a normalized red component (Normalized R), and the Y axis of the graph represents a normalized blue component (Normalized B).

Referring to FIG. 10, a first gray candidate cluster G_1 may be defined in a color space including the normalized red component Normalized R and the normalized blue component Normalized B. For example, in the graph shown in FIG. 10, the color space where a constant luminance Y is assumed, and a color information distribution of partition cells based on a relative change in color component in a color space region is shown.

The normalized red component Normalized R may be, for example, R/(R+B+G) or R/G. Also, the normalized blue component Normalized B may be, for example, B/(R+B+G) or B/G.

An image processing device such as the image signal processor 1 of FIG. 1 may use partial data—that is, a mean value for sampled data instead of using whole data of a sensed image IMG. A white point may be calculated based on a mean value of a first gray candidate cluster G_1, and thus, in order to extract the white point by using the patching data, a selection of the first gray candidate cluster G_1 may be first performed.

The first gray candidate cluster G_1 may include a plurality of gray candidate partition cells PC_G. The gray candidate partition cells PC_G may be partition cells, of which a red component and a blue component are all included in the first gray candidate cluster G_1, of a plurality of partition cells included in image data D_IMG, for example.

In an exemplary embodiment, an estimation value FdAvg of a skin tone of the image data D_IMG may be included in the first gray candidate cluster G_1. The estimation value FdAvg may include a red component and a blue component corresponding to the skin tone. In an exemplary embodiment, the estimation value FdAvg may be a mean value of color components of some of a plurality of partition cells included in a face image.

In an exemplary embodiment, which of a plurality of gray candidate partition cells PC included in the first gray candidate cluster G_1 are selected as a gray candidate partition cell of a second gray candidate cluster may be determined based on the estimation value FdAvg and color information included in each of the gray candidate partition cells PC. For example, gray candidate partition cells selected as the second gray candidate cluster may be based on calculation of a white point. The selection of the second gray candidate cluster will be described below.

Figure 11:
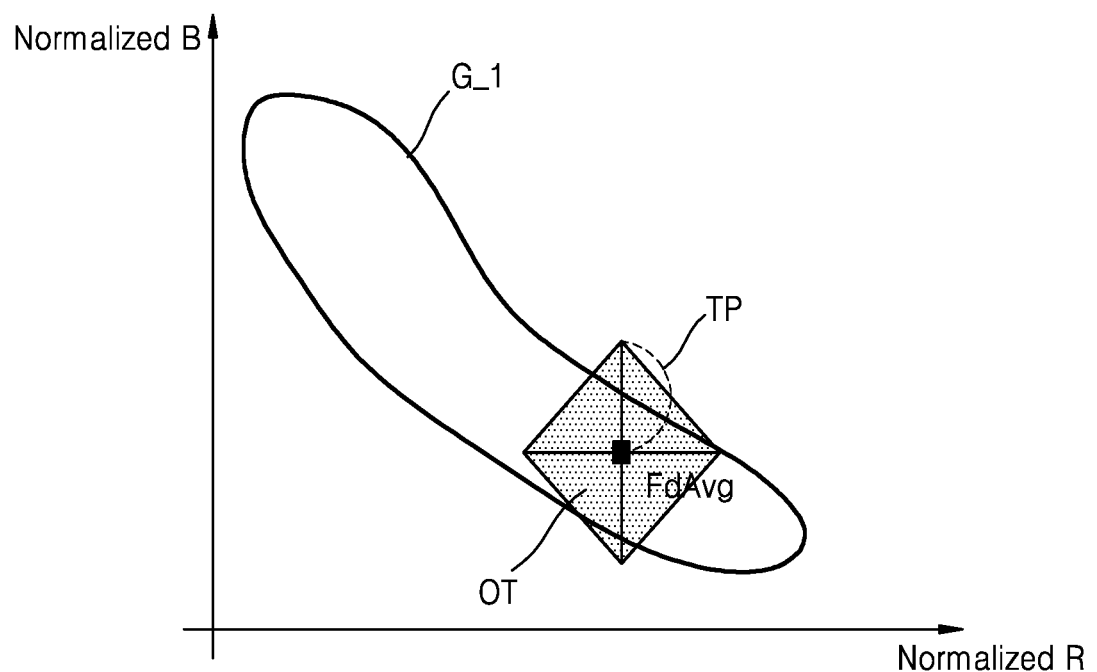
FIG. 11 is diagram for describing an operation of selecting a second gray candidate cluster, according to an exemplary embodiment.

FIG. 11 is another graph further describing the selection of a second gray candidate cluster according to an exemplary embodiment.

Referring to FIG. 11, a red component and a blue component of an arbitrary partition cell included in a first gray candidate cluster G_1 may be respectively defined as CurrentPatch.R and CurrentPatch.B, and a red component and a blue component of an estimation value FdAvg may be respectively defined as FdAvg.R and FdAvg.B. In this case, partition cells satisfying the following condition among a plurality of partition cells included in the first gray candidate cluster G_1 may each be selected as an outlier OT.

$$\text{ABS}(CurrentPatch.R-FdAvg.R)+\text{ABS}(CurrentPatch.B-FdAvg.B)<\text{Constant value(TP)} \quad (1)$$

In Equation (1), ABS denotes an absolute value, and TP denotes a tuning parameter. In other words, an arbitrary partition cell included in the first gray candidate cluster G_1 may be selected as an outlier when a sum of an absolute value of a difference between a red component of the arbitrary partition cell and a red component of an estimation value and an absolute value of a difference between a blue component of the arbitrary partition cell and a blue component of the estimation value is less than the tuning parameter. For example, a region of the outlier based on Equation (1) may have a diamond shape where estimation value FdAvg coordinates correspond to a center. In an exemplary embodiment, the outlier may be excluded from a second gray candidate cluster and may be excluded from calculation of a white point.

Figure 12:
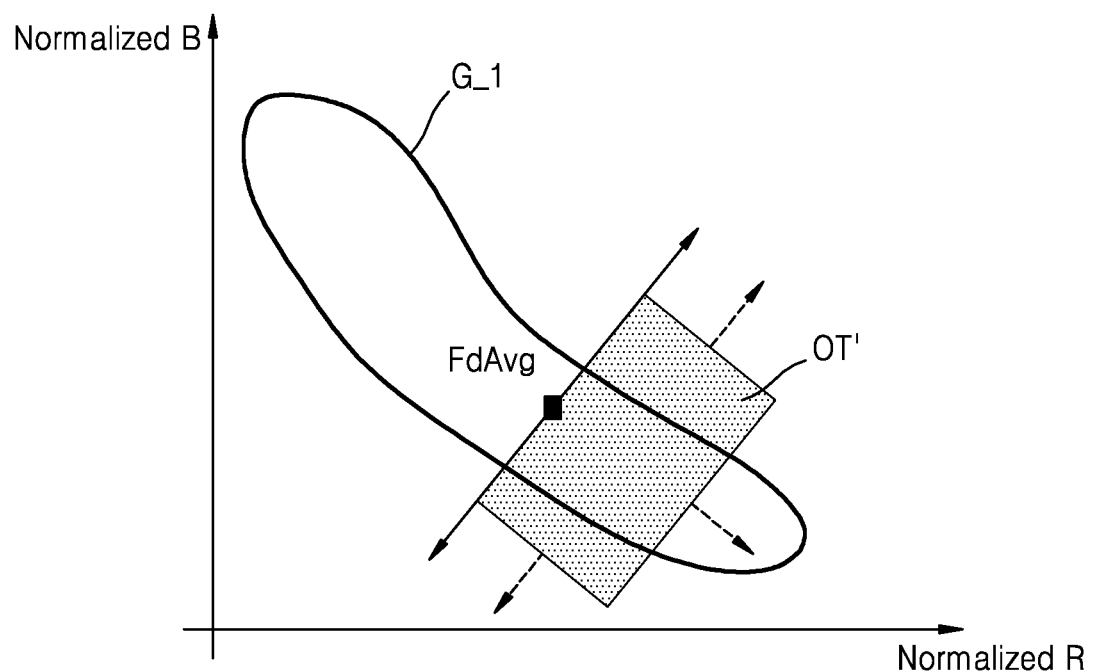
FIG. 12 is diagram for describing an operation of selecting a second gray candidate cluster, according to another exemplary embodiment.

FIG. 12 is another graph further describing the selection of a second gray candidate cluster according to another exemplary embodiment.

Referring to FIGS. 11 and 12, partition cells satisfying the following condition among a plurality of partition cells included in a first gray candidate cluster G_1 may each be selected as an outlier OT'.

$$(CurrentPatch.R-CurrentPatch.B)>(FdAvg.R-FdAvg.B) \quad (2)$$

According to Equation (2), an arbitrary partition cell included in the first gray candidate cluster G_1 may be selected as an outlier OT' when a difference between a red component and a blue component of the arbitrary partition cell is greater than a difference between a red component and a blue component of an estimation value. For example, a region of the outlier OT' based on Equation (2) may be a first gray candidate cluster G_1 region which is located in a right region with respect to a first straight line L1 crossing estimation value FdAvg coordinates.

Figure 13:
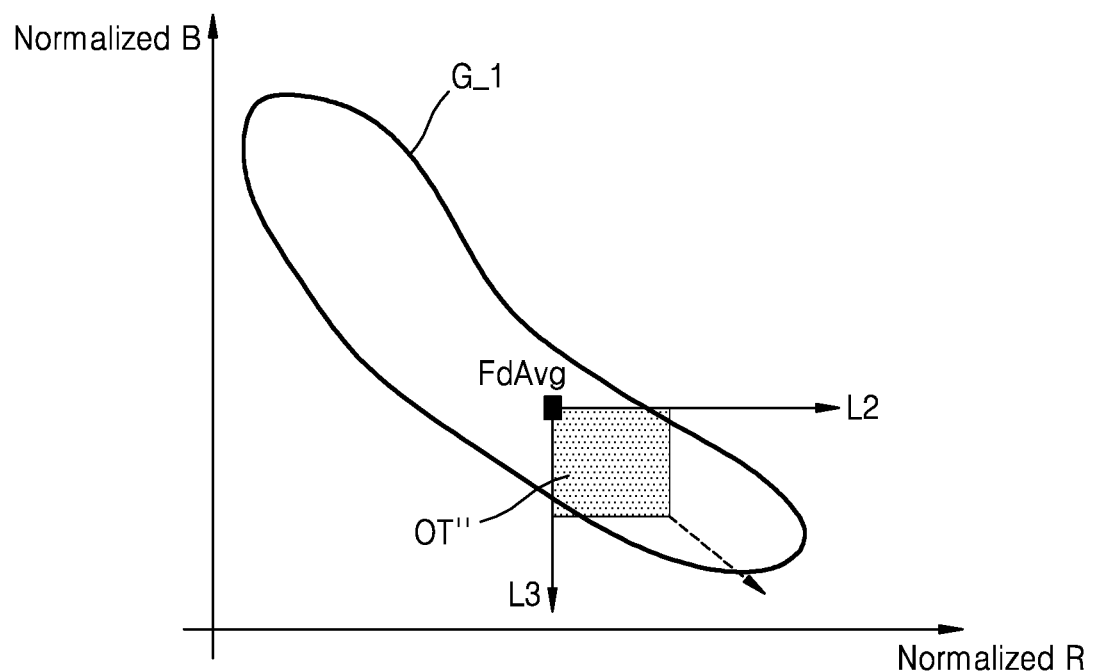
FIG. 13 is diagram for describing an operation of selecting a second gray candidate cluster, according to another exemplary embodiment.

FIG. 13 is another graph further describing the selection of a second gray candidate cluster according to another exemplary embodiment.

Referring to FIGS. 11 and 13, partition cells satisfying the following condition among a plurality of partition cells included in a first gray candidate cluster G_1 may each be selected as an outlier OT'''.

$$(CurrentPatch.R>FdAvg.R)\&\&$$
$$(CurrentPatch.B<FdAvg.B) \quad (3)$$

According to Equation (3), an arbitrary partition cell included in the first gray candidate cluster G_1 may be selected as an outlier OT''' in a case of satisfying a condition where a red component of the arbitrary partition cell is greater than a red component of an estimation value and a blue component of the arbitrary partition cell is greater than a blue component of the estimation value. For example, a region of the outlier OT''' based on Equation (3) may be a first gray candidate cluster G_1 region which is located in a quadrant configured by a second straight line L2 and a third straight line L3 with respect to the second straight line L2 and the third straight line L3 which pass by estimation value FdAvg coordinates.

Figure 14:
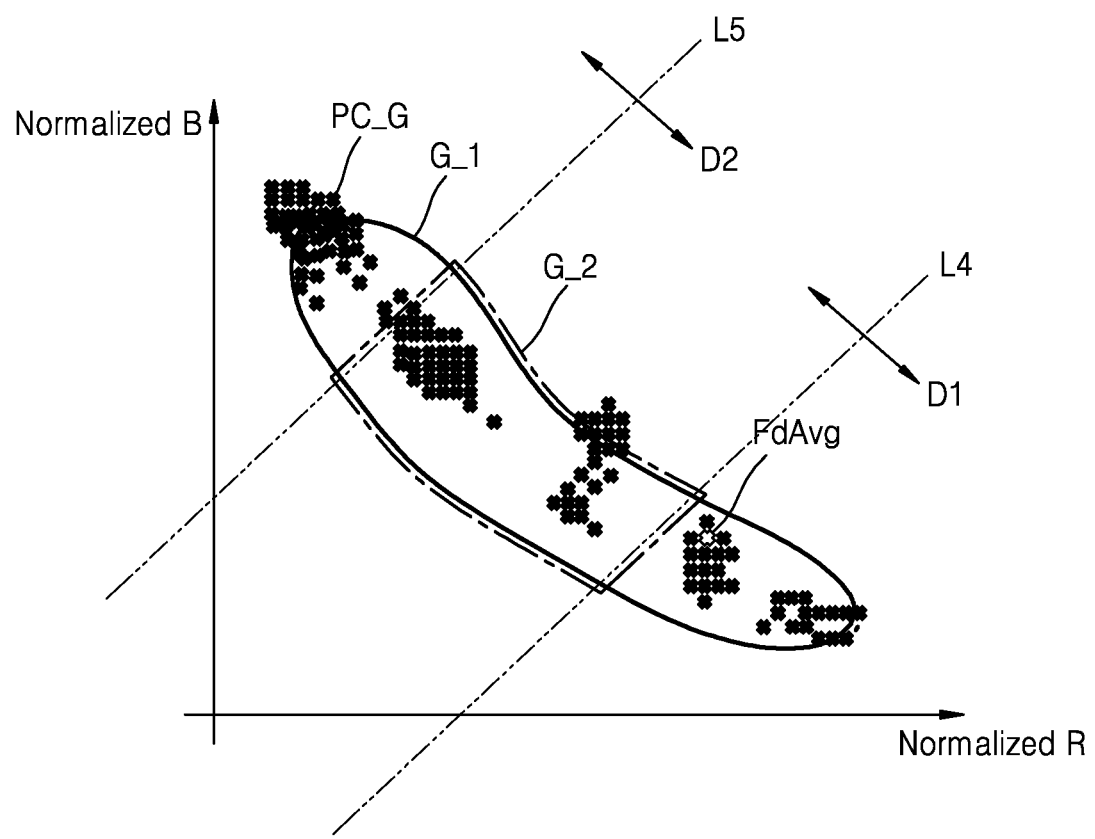
FIG. 14 is a diagram for describing a second gray candidate cluster selected according to an exemplary embodiment.

FIG. 14 is another graph further describing the selection of a second gray candidate cluster according to an exemplary embodiment.

Referring to FIG. 14, a first gray candidate cluster G_1 may be defined in a color space, and a partial region of the first gray candidate cluster G_1 may be defined as a second gray candidate cluster G_2. In an exemplary embodiment, the second gray candidate cluster G_2 may be selected based on at least one of the embodiments of FIGS. 11 to 13. In other words, a plurality of partition cells included in the second gray candidate cluster G_2 may satisfy at least one of the conditions disclosed in Equations (1) to (3).

For example, the second gray candidate cluster G_2 may be defined by a fourth straight line L4 and a fifth straight line L5 in the first gray candidate cluster G_1. In detail, partition cells of the first gray candidate cluster G_1 which are located in a region between the fourth straight line L4 and the fifth straight line L5 may be selected as partition cells of the second gray candidate cluster G_2. The fourth straight line L4 and the fifth straight line L5 may each be a virtual line configuring a boundary of the second gray candidate cluster G_2.

In an exemplary embodiment, the fourth straight line L4 may be adjusted along a first arrow D1, based on one of Equations (1) to (3). Partition cells excluded from the selection of the second gray candidate cluster G_2 with respect to the fourth straight line L4 may be, for example, partition cells including a relatively excessive red component.

In an exemplary embodiment, the fifth straight line L5 may be adjusted along a second arrow D2, based on clustering-based statistical processing of pieces of sample image data. For example, the fifth straight line L5 may be adjusted along the second arrow D2, based on various statistical processing performed for excluding a partition cell including an excessive blue component by using the pieces of sample image data. Partition cells excluded from the selection of the second gray candidate cluster G_2 with respect to the fifth straight line L5 may be, for example, partition cells including a relatively excessive blue component.

Therefore, partition cells included in the second gray candidate cluster G_2 may be based on a selection of a white point, and the other partition cells which are included in the first gray candidate cluster G_1 but are not selected as partition cells of the second gray candidate cluster G_2 may be excluded from the selection of the white point. By decreasing a region of the first gray candidate cluster G_1 to a region of the second gray candidate cluster G_2, partition cells including a relatively excessive red or blue component may be excluded from the selection of the white point. Accordingly, a white point with improved accuracy may be selected.

Figure 15:
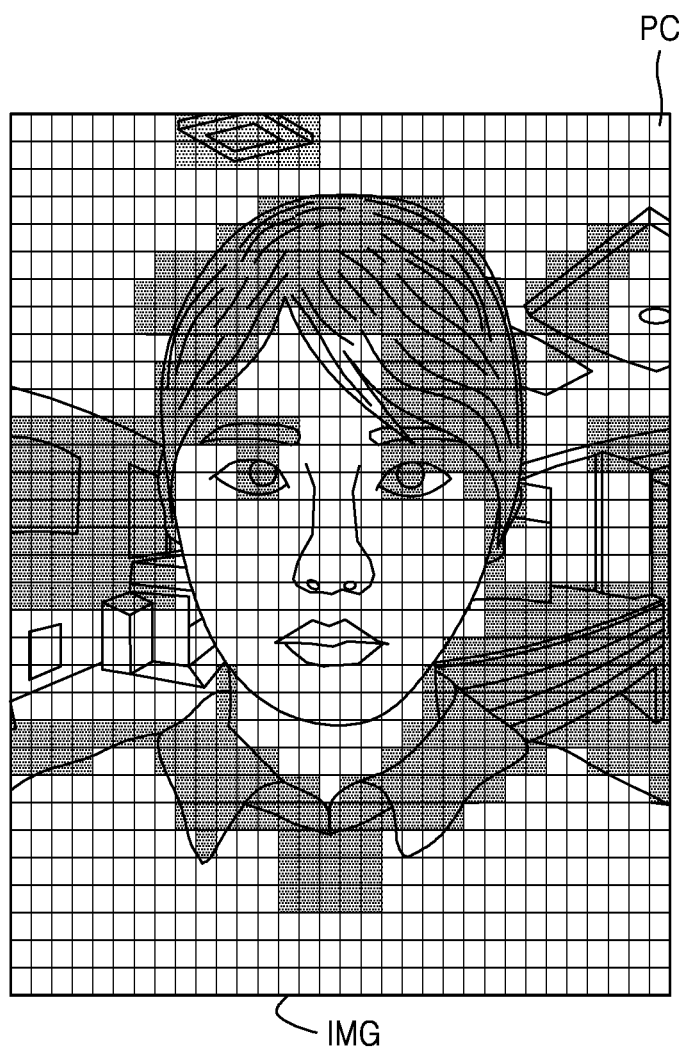
FIG. 15 is a diagram illustrating an example where partition cells included in a second gray candidate cluster selected according to an exemplary embodiment are displayed on an actual image.

FIG. 15 is a diagram illustrating an example wherein partition cells included in a second gray candidate cluster selected according to an exemplary embodiment are displayed on an actual image.

Referring to FIG. 15, an image IMG may include a face image and may be divided into a plurality of partition cells PC. Each of the partition cells PC may be, for example, a patch or a pixel.

Some of the plurality of partition cells PC included in the image IMG may each be selected as outlier for detection of a white point and may be excluded from the detection of the white point. Hatched partition cells of the plurality of partition cells PC included in the image IMG may be gray candidate partition cells which are based on the detection of the white point, and the other partition cells may be the partition cells selected as the outlier. For example, the hatched partition cells may be partition cells included in the second gray candidate cluster G_2 of FIG. 14.

For example, an outlier may be selected based on an estimation value of a skin tone of a face image and may be excluded from the detection of the white point. As a result, partition cells, having a color component similar to a skin color, of a plurality of partition cells included in an image may be excluded from the detection of the white point. Therefore, even when an inaccurate face color is included in the image, the AWB with improved accuracy may be performed.

Figure 16:
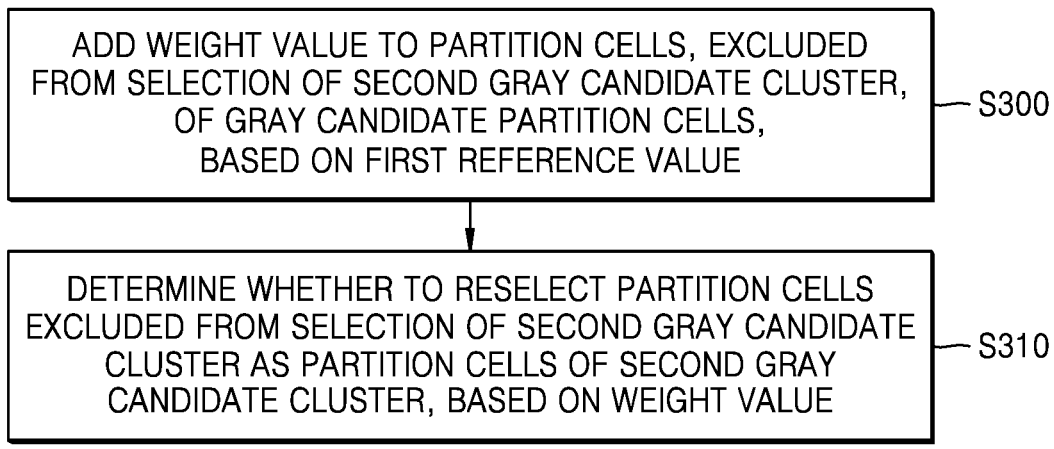
FIG. 16 is a flowchart illustrating an operation of an image signal processor according to an exemplary embodiment.

FIG. 16 is a flowchart summarizing a method that may be executed by the image signal processor 20 of FIG. 1 according to an exemplary embodiment following the method previously described in relation to FIG. 9.

Referring to FIG. 16, the image signal processor 20 may add a weight value to partition cells, excluded from a selection of a second gray candidate cluster, of a plurality of gray candidate partition cells, based on a first reference value (S300). The gray candidate partition cells may be, for example, partition cells included in a first gray candidate cluster.

For example, the image signal processor 20 may select a weight value within a range of a first weight value or more and the second weight value or less and may add the selected weight value to the partition cells, excluded from the selection of the second gray candidate cluster, of the plurality of gray candidate partition cells, based on the first reference value. Each of the first weight value and the second weight value may be a constant, and the second weight value may be greater than the first weight value. In an exemplary embodiment, the first reference value may be calculated based on clustering-based statistical processing of pieces of sample image data.

For example, in the clustering-based statistical processing, the AWB may be performed on the pieces of sample image data a plurality of times, and the first reference value which allows a partition cell having a gray component to be balanced close to an ideal gray component may be calculated. The ideal gray component may include, for example, a red component, a blue component, and a green component at the same ratio.

Thereafter, the image signal processor 20 may determine whether to reselect the partition cells excluded from the selection of the second gray candidate cluster as partition cells of the second gray candidate cluster, based on the weight value (S310). For example, partition cells to which an arbitrary weight value is added may be reselected as the partition cells of the second gray candidate cluster, and partition cells to which another arbitrary weight value is added may be excluded from the second gray candidate cluster. In an exemplary embodiment, partition cells to which the first weight value is added may not be reselected as the partition cells of the second gray candidate cluster, and at least some of partition cells to which a weight value greater than the first weight value is added may be reselected as the partition cells of the second gray candidate cluster.

Figure 17:
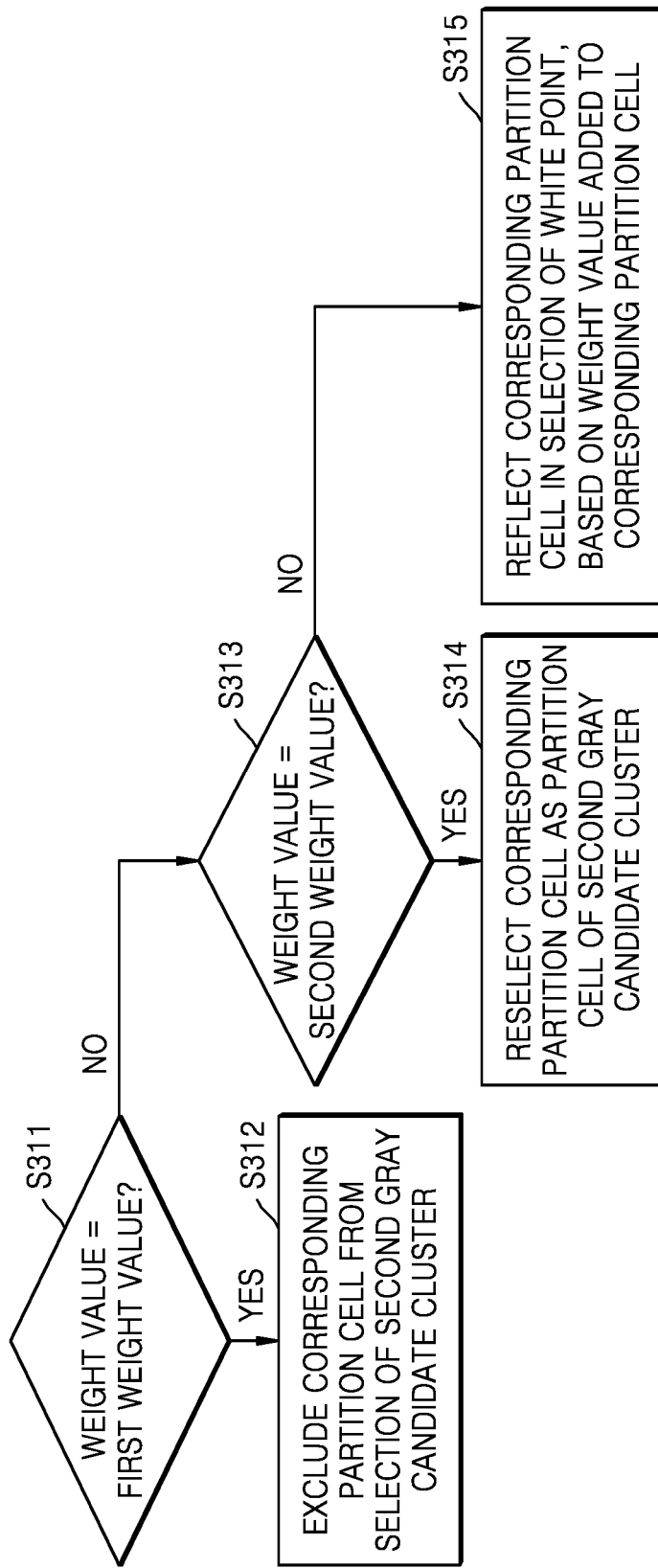
FIG. 17 is a flowchart for describing an operation based on a weight value added according to an exemplary embodiment.

FIG. 17 is a flowchart summarizing a method based on a weight value added according to an exemplary embodiment. FIG. 17 may be understood as further describing on one example the method step S310 of FIG. 16.

Referring to FIG. 17, the image signal processor 20 may determine whether a weight value added to an arbitrary gray candidate partition cell is the first weight value (S311). When the first weight value is added, a corresponding partition cell may be excluded from the selection of the second gray candidate cluster (S312).

When the weight value added to the arbitrary gray candidate partition cell is not the first weight value, the image signal processor 20 may determine whether the weight value added to a corresponding partition cell is the second weight value (S313). For example, the second weight value may be greater than the first weight value. When the second weight value is added, the corresponding partition cell may be reselected as a partition cell of the second gray candidate cluster (S314).

When the weight value added to the arbitrary gray candidate partition cell is not the first weight value or the second weight value, the image signal processor 20 may reflect the corresponding partition cell in the selection of the white point, based on the weight value added to the corresponding partition cell (S315). In an exemplary embodiment, gray candidate partition cells to which a weight value instead of the first and second weight values is added may be reflected at a lower level of contribution to the selection of the white point than the second gray candidate cluster.

For example, if instead of the first and second weight values, the weight value added to the gray candidate partition cells is 0.5, corresponding partition cells may contribute to the selection of the white point by half of a level of contribution of the second gray candidate cluster to the selection of the white point. For example, color components of the gray candidate partition cells to which the weight value instead of the first and second weight values is added may be multiplied by the weight value added to the gray candidate partition cells, and then, may be reflected in the selection of the white point.

Based on a reselection operation based on the added weight value, partition cells, used for the selection of the white point, of a plurality of partition cells selected as an outlier may be selected as the partition cells of the second gray candidate cluster again. Accordingly, a white point with more improved accuracy is detected.

From the foregoing description of exemplary embodiments it may be readily understood that the inventive concept provides for the calculation and use of a skin tone estimation value that is much more accurate than previously provided. In various embodiments AWB may be performed by an image signal processor, wherein the AWB includes the steps of dividing image data including a face image into a plurality of partition cells, detecting a face region associated with the face image from the image data, and selecting partition cells associated with the face image from among the plurality of partition cells to define a set of selected partition cells. However, rather than merely relying upon this set of selected partition cells—which as associated with the face image—certain embodiments of the invention further define (or refine) the set of selected partition cells to define a set of further selected partition cells, and it is this second or further selected set of partition cells that is used to calculate a skin tone estimation value.

As has been described above there are many possible approaches to this further selection of face image associated partition cells. For example, the further defining of the set of selected partition cells may include: (1) extracting vertex information for each partition cell in the set of selected partition cells, and including in the set of further selected partition cells only those selected partition cells having all vertexes included in the face image; (2) excluding from the set of further selected partition cells those selected partition cells including at least one of an eye and an eyebrow; (3) extracting respective luminance values for each of the selected partition cells, and excluding from the set of further selected partition cells those selected partition cells having a luminance value less a luminance threshold; and (4) calculating a global mean value of color components for the set of selected partition cells, color-detecting each of the selected partition cells to determine whether a color component for each of the selected partition cells has a difference with the global mean value greater than a reference deviation, and excluding from the set of further selected partition cells those selected partition cells having a color component difference with the global mean value greater than the reference deviation.

Figure 18:
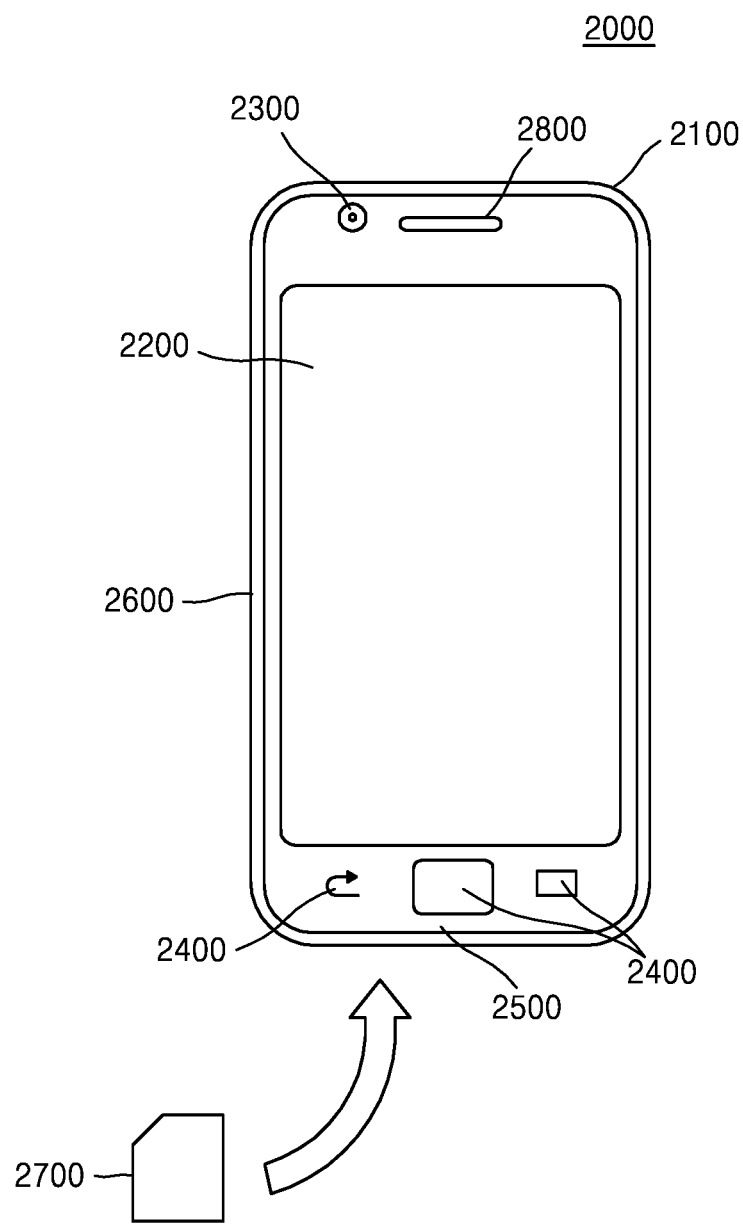
FIG. 18 is a diagram illustrating an example of a mobile device equipped with an image signal processor according to an exemplary embodiment.

FIG. 18 is a diagram illustrating an example of a mobile device 2000 incorporating an image signal processor according to an exemplary embodiment. The mobile device 2000 may be equipped with the image signal processor described above with reference to FIGS. 1 to 17. Therefore, the AWB may be performed on images captured by a camera 2300, according to the above-described embodiment.

The mobile device 2000 may be a smartphone in which functions are not limited and a number of functions are changeable or extendable with an application program. The mobile device 2000 may include an embedded antenna 2100 for exchanging a radio frequency (RF) signal with a wireless base station, and moreover, may include a display screen 2200, such as a liquid crystal display (LCD) or an organic light emitting diode (OLED) screen, for displaying images captured by the camera 2300 or images received by the antenna 2100. The mobile device 2000 may include an operation panel 2400 including a control button and a touch panel. Also, if the display screen 2200 is a touch screen, the operation panel 2400 may further include a touch sensing panel of the display screen 2200. The mobile device 2000 may include a speaker 2800 (or another type of output unit) for outputting a voice and a sound and a microphone 2500 (or another type of sound input unit) through which a voice and a sound are input.

The mobile device 2000 may further include the camera 2300, such as a CCD camera, for capturing an image or a video. Also, the mobile device 2000 may include a storage medium 2700 for storing an image or video data, which is captured by the camera 2300, received through an e-mail, or obtained through another manner, and a slot 2600 which enables the storage medium 2700 to be equipped in the mobile device 2000. The storage medium 2700 may be a secure digital (SD) card or flash memory such as electrically erasable and programmable read only memory (EEPROM) embedded in a plastic case.

While the inventive concept has been particularly shown and described with reference to embodiments thereof, it will be understood that various changes in form and details may be made therein without departing from the scope of the following claims.

What is claimed is:

1. An auto white balance method performed by an image signal processor, the auto white balance method comprising:
   dividing image data, including a face image, into a plurality of partition cells;
   detecting a face region for the face image in the image data;
   selecting partition cells from among partition cells associated with the face region;
   calculating a skin tone estimation value for the image data from the selected partition cells;
   selecting outlier partition cells among the partition cells based on the skin tone estimation value, wherein outlier partition cells have a color component similar to a skin color;
   selecting a white point within a portion of the partition cells that excludes the outlier partition cells; and
   making color sense adjustment to the image data in relation to the white point.

2. The auto white balance method of claim 1, wherein the selecting of the partition cells further comprises selecting partition cells from among a plurality of partition cells having all vertexes included in the face region.

3. The auto white balance method of claim 1, wherein the selecting of the partition cells further comprises excepting from the selected partition cells those partition cells among the partition cells associated with the face region which include at least one of an eye image and an eyebrow image.

4. The auto white balance method of claim 1, wherein the selecting of the partition cells further comprises excepting from the selected partition cells those partition cells among the partition cells associated with the face region which have a corresponding luminance value equal to or less than a threshold luminance.

5. The auto white balance method of claim 1, wherein the calculating of the skin tone estimation value comprises:
   calculating a global mean value of color components of the selected partition cells; and
   comparing the global mean value of color components of the selected partition cells to color-detect partition cells;
   identifying outlier color-detected partition cells having a color component having a difference with respect to the global mean value of color components of the selected partition cells greater than a reference deviation; and
   calculating a final mean value from the selected partition cells, excepting the outlier color-detected partition cells, as the skin tone estimation value.

6. The auto white balance method of claim 5, further comprising:
   calculating a variance of the color component for each of the selected partition cells, wherein the reference deviation is a multiplication of the variance and a tuning parameter.

7. The auto white balance method of claim 1, wherein each of the plurality of partition cells is a patch including a plurality of pixels.

8. The auto white balance method of claim 1, further comprising:
   adding a weight value to each of the plurality of partition cells; and
   performing a reselection on at least one of the selected outlier partition cells based on the weight value.

9. An auto white balance method comprising:
   dividing image data including a face image into a plurality of partition cells;
   detecting a face region for the face image in the image data;
   selecting partition cells from among partition cells associated with the face region;
   calculating a skin tone estimation value based on the selected partition cells included in the face region;
   selecting gray candidate partition cells included in a first gray candidate cluster among the plurality of partition cells included in the image data, wherein the first gray candidate cluster is defined in a color space;
   selecting outlier partition cells among the partition cells based on the skin tone estimation value, wherein the outlier partition cells have a color component similar to a skin color;
   selecting a second gray candidate cluster within a portion of the partition cells that excludes the outlier partition cells; and
   performing auto white balance on the image data based on the second gray candidate cluster.

10. The auto white balance method of claim 9, wherein the gray candidate partition cells are selected as partition cells of the first gray candidate cluster, based on the skin tone estimation value.

11. The auto white balance method of claim 9, wherein:
   the skin tone estimation value comprises a red component estimation value and a blue component estimation value of a skin tone, and the selecting of the outlier partition cells comprises determining whether to select, as an outlier partition cell, a first partition cell having a value of a red component and a value of a blue component among the gray candidate partition cells, based on at least one of the value of the red component, the value of the blue component, an estimation value of the red component, and an estimation value of the blue component.

12. The auto white balance method of claim 11, wherein the selecting of the outlier partition cells comprises, when a sum of: (1) an absolute value of a difference between the value of the red component and the estimation value of the red component and (2) an absolute value of a difference between the value of the blue component and the estimation value of the blue component is less than a tuning parameter, selecting the first partition cell as the outlier partition cell.

13. The auto white balance method of claim 11, wherein the selecting of the outlier partition cells comprises, when a difference between the value of the red component and the value of the blue component is greater than a difference between the estimation value of the red component and the estimation value of the blue component, selecting the first partition cell as the outlier partition cell.

14. The auto white balance method of claim 11, wherein the selecting of the outlier partition cells comprises, when the value of the red component is greater than the estimation value of the red component and the value of the blue component is less than the estimation value of the blue component, selecting the first partition cell as the outlier partition cell.

15. The auto white balance method of claim 9, wherein the color space is configured with a normalization value of each of a red (R) component and a blue (B) component with respect to a sum of the red (R) component, a green (G) component, and the blue (B) component.

16. The auto white balance method of claim 11, further comprising:
    adding a weight value to the outlier partition cells based on a first reference value calculated based on clustering-based statistical processing of pieces of sample image data; and
    determining whether to reselect the outlier partition cells as partition cells of the second gray candidate cluster, based on the weight value.

17. The auto white balance method of claim 16, wherein:
    the adding of the weight value comprises adding, as the weight value, one value within a range of a first weight value or more and a second weight value or less, and
    the determining of whether to reselect the partition cells comprises:
        excluding partition cells, where the weight value is the first weight value, from the selection of the gray candidate partition cells; and
        reselecting, as partition cells of the first gray candidate cluster, at least some of partition cells, where the weight value is greater than the first weight value, of the partition cells excluded from the selection of the gray candidate partition cells.

18. The auto white balance method of claim 9, wherein the skin tone estimation value is a mean value of color components of at least some of the plurality of partition cells included in the face image.

19. An image processor comprising:
    an image sensor configured to capture an image and output image data; and
    an image signal processor configured to:
        divide the image data, including a face image, into a plurality of partition cells;
        detect a face region for the face image in the image data;
        select partition cells from among partition cells associated with the face region;
        calculate a skin tone estimation value for the image data from the selected partition cells;
        select outlier partition cells among the partition cells based on the skin tone estimation value, wherein outlier partition cells have a color component similar to a skin color;
        select a white point within a portion of the partition cells that excludes the outlier partition cells; and
        make color sense adjustment to the image data in relation to the white point.

20. An image processor of claim 19, wherein the image sensor comprises at least one of a charge-coupled device (CCD) and/or a complementary metal-oxide semiconductor (COMS) image sensor (CIS).

* * * * *